(12) United States Patent
Gho et al.

(10) Patent No.: US 8,050,363 B2
(45) Date of Patent: Nov. 1, 2011

(54) TURBO DECODER AND METHOD FOR TURBO DECODING A DOUBLE-BINARY CIRCULAR RECURSIVE SYSTEMATIC CONVOLUTIONAL ENCODED SIGNAL

(75) Inventors: Gwang-Hyun Gho, Cupertino, CA (US); Won-Joon Choi, Cupertino, CA (US)

(73) Assignee: Amicos Wireless Technology Ltd. (KY)

( * ) Notice: Subject to any disclaimer, the term of this patent is extended or adjusted under 35 U.S.C. 154(b) by 849 days.

(21) Appl. No.: 12/115,027

(22) Filed: May 5, 2008

(65) Prior Publication Data

US 2008/0273631 A1    Nov. 6, 2008

Related U.S. Application Data

(60) Provisional application No. 60/927,499, filed on May 4, 2007.

(51) Int. Cl.
*H03M 13/03*    (2006.01)

(52) U.S. Cl. .................. 375/341; 375/267; 714/792

(58) Field of Classification Search .................. 375/265, 375/340, 341; 714/786, 782
See application file for complete search history.

(56) References Cited

U.S. PATENT DOCUMENTS

| 2005/0009481 | A1 | 1/2005 | Bushner |
| 2005/0102600 | A1 | 5/2005 | Anandakumar |
| 2006/0023802 | A1 | 2/2006 | Balakrishnan et al. |
| 2008/0123781 | A1* | 5/2008 | Pisek et al. .................. 375/340 |
| 2010/0241935 | A1* | 9/2010 | Ancora et al. ................ 714/807 |

* cited by examiner

*Primary Examiner* — David Lugo
(74) *Attorney, Agent, or Firm* — Thomas H. Ham; Wilson Ham & Holman (57) ABSTRACT

A Turbo decoder and method for decoding a double-binary circular recursive systematic convolutional (DBCRSC) encoded signal with unknown initial and final states executes iterations of forward and backward recursion on a payload block of the DBCRSC encoded signal and a padded block using an estimated forward state metric (FSM) and an estimated backward state metric (BSM), which are updated at one or more iterations.

26 Claims, 9 Drawing Sheets

TURBO DECODER AND METHOD FOR TURBO DECODING A DOUBLE-BINARY CIRCULAR RECURSIVE SYSTEMATIC CONVOLUTIONAL ENCODED SIGNAL

CROSS REFERENCE TO RELATED APPLICATION

This application is entitled to the benefit of U.S. Provisional Patent Application Ser. No. 60/927,499, filed on May 4, 2007, which is incorporated herein by reference.

BACKGROUND OF THE INVENTION

Orthogonal Frequency Division Multiple Access (OFDMA) technology is getting very popular in modern communication systems since the OFDMA technology can efficiently support multiple mobile stations with limited bandwidth and easily provide Quality of Service (QoS). The OFDMA technology is a multiple access version of orthogonal frequency-division multiplexing (OFDM). OFDM is a modulation technique for data transmission based on frequency-division multiplexing (FDM), which uses different frequency channels to transmit multiple streams of data. In OFDM systems, a wide channel is divided into multiple narrow-band subcarriers, which allow orthogonal modulated streams of data to be transmitted in parallel on the subcarriers.

In OFDMA systems, multiple subscribers can simultaneously use different subcarriers for signal transmission. Thus, in an OFDMA system, multiple data bursts can be transmitted from a base station to multiple mobile stations in the same time frame but allocated in different frequency subcarriers. Consequently, an OFDMA system can support multiple mobile stations using different subcarriers.

In a conventional OFDMA transmitter, outgoing data is processed for wireless transmission as OFDMA signals, including being forward error correction encoded. Under the mobile WiMAX standard, the outgoing data can be encoded using a double-binary circular recursive systematic convolutional (DBCRSC) encoding scheme. Thus, in an OFDMA receiver, the incoming OFDMA signals must be decoded using an appropriate decoding technique to extract the original data in the signals. One of the techniques to decode the incoming DBCRSC encoded OFDMA signals is Turbo decoding. However, Turbo decoding has been applied in the past to situations where the initial and final states of the encoded signals were known to the receiver. Under the mobile WiMAX standard, the initial and final states are unknown to the receiver. The only information known to the receiver is that the initial and final states of the encoded signals are the same. Thus, conventional Turbo decoding techniques are not appropriate to decode DBCRSC encoded signals under the mobile WiMAX standard.

In view of this requirement, there is a need for a Turbo decoder and method for Turbo decoding a DBCRSC encoded signal in which initial and final states of the encoded signals are unknown.

SUMMARY OF THE INVENTION

A Turbo decoder and method for decoding a double-binary circular recursive systematic convolutional (DBCRSC) encoded signal with unknown initial and final states executes iterations of forward and backward recursion on a payload block of the DBCRSC encoded signal and a padded block using an estimated forward state metric (FSM) and an estimated backward state metric (BSM), which are updated at one or more iterations.

A method for Turbo decoding a DBCRSC encoded signal with unknown initial and final states in accordance with an embodiment of the invention comprises (a) accessing a payload block of the DBCRSC encoded signal with unknown initial and final states to receive the payload block and a padded block, the padded block including at least a portion of the payload block, the payload block and the padded block being parts of a total code block, (b) executing an iteration of a forward recursion on portions of the total code block to produce forward state metrics (FSMs) for the total code block using an estimated FSM for a first selected portion of the total code block, (c) executing an iteration of a backward recursion on the portions of the total code block to produce backward state metrics (BSMs) for the total code block using an estimated BSM for a second selected portion of the total code block, (d) executing another iteration of the forward recursion on the portions of the total code block using an updated estimated FSM as a starting FSM for the first selected portion of the total block to produce updated FSMs, (e) executing another iteration of the backward recursion on the portions of the total code block using an updated estimated BSM as a starting BSM for the second selected portion of the total block to produce updated BSMs, and (f) producing a decoded signal of the DBCRSC encoded signal using the updated FSMs and the updated BSMs.

A Turbo decoder for decoding a DBCRSC encoded signal with unknown initial and final states in accordance with an embodiment of the invention comprises a decoding module and an output module. The decoding module is connected to receive a payload block of the DBCRSC encoded signal with unknown initial and final states and a padded block. The padded block includes at least a portion of the payload block. The payload block and the padded block are parts of a total code block. The decoding module comprises a forward state metric (FSM) calculation unit a backward state metric (BSM) calculation module. The FSM calculation unit is configured to execute an iteration of a forward recursion on portions of the total code block to produce FSMs for the total code block using an estimated FSM for a first selected portion of the total code block. The FSM calculation unit is further configured to execute another iteration of the forward recursion on the portions of the total code block using an updated estimated FSM as a starting FSM for the first selected portion of the total block to produce updated FSMs. The BSM calculation module is configured to execute an iteration of a backward recursion on the portions of the total code block to produce BSMs for the total code block using an estimated BSM for a second selected portion of the total code block. The BSM calculation unit is further configured to perform another iteration of the backward recursion on the portions of the total code block using an updated estimated BSM for a starting BSM for the second selected portion of the total block to produce updated BSM. The output module is operably connected to the decoding module. The output module is configured to produce a decoded signal of the DBCRSC encoded signal using the updated FSMs and the updated BSMs.

Other aspects and advantages of the present invention will become apparent from the following detailed description, taken in conjunction with the accompanying drawings, illustrated by way of example of the principles of the invention.

DETAILED DESCRIPTION

Figure 1:
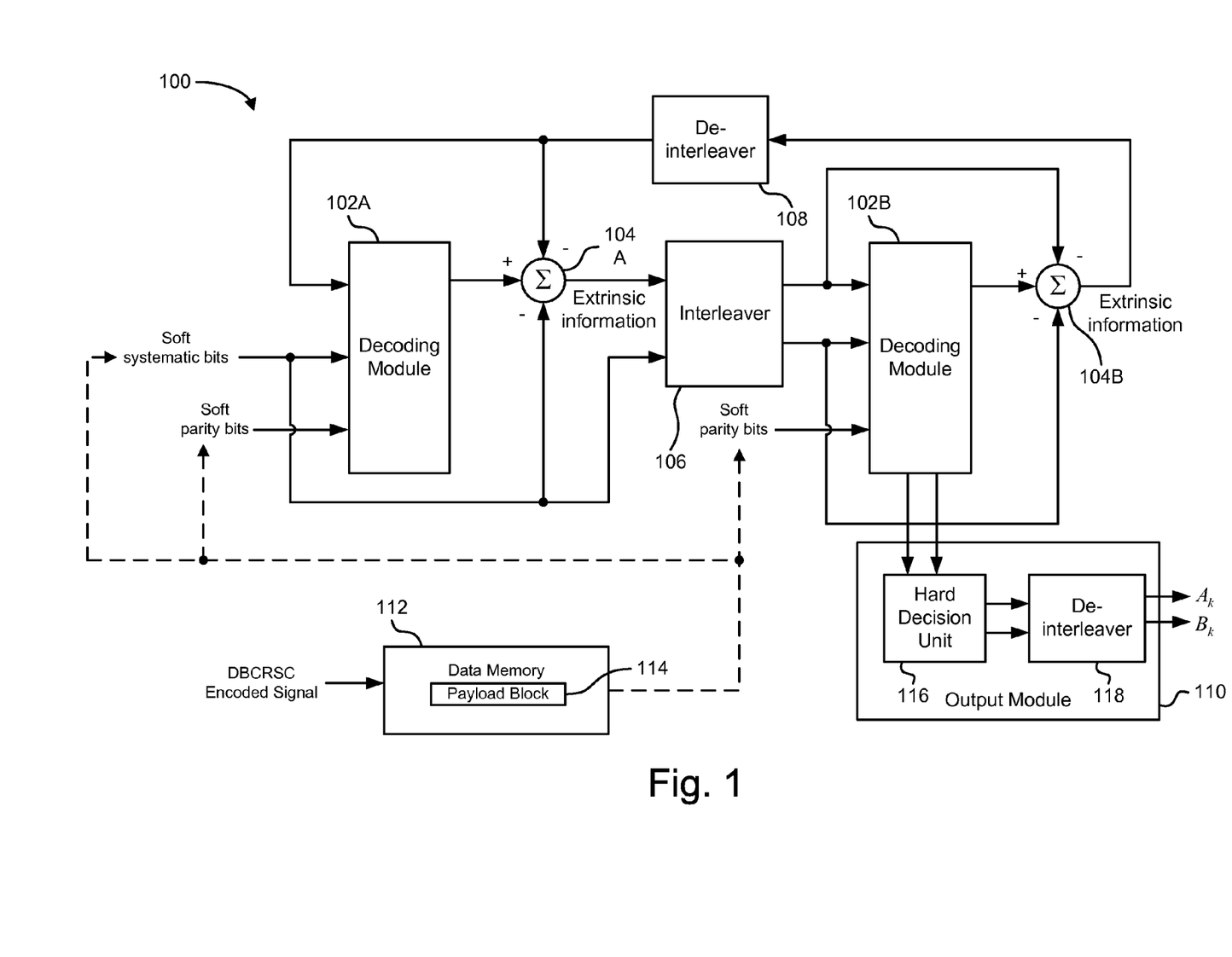
FIG. 1 is a block diagram of a Turbo decoder in accordance with an embodiment of the invention.

With reference to FIG. 1, a Turbo decoder 100 in accordance with an embodiment of the invention is shown. The Turbo decoder 100 operates to decode signals that have been encoded using a double-binary circular recursive systematic convolutional (DBCRSC) encoding for forward error correction (FEC). The Turbo decoder 100 uses a Turbo decoding scheme to decode a DBCRSC encoded signal in which initial (starting) and final (ending) states of the encoded signal are the same but unknown. As described in more detail below, the Turbo decoder 100 is designed to perform a Turbo decoding operation that reduces decoding delay, calculation complexity and memory requirement. The Turbo decoder 100 can be used in an Orthogonal Frequency Division Multiple (OFDM) based receiver, such as an Orthogonal Frequency Division Multiple Access (OFDMA) receiver, and also in other digital communication systems that employ CRSC as FEC scheme.

Figure 2:
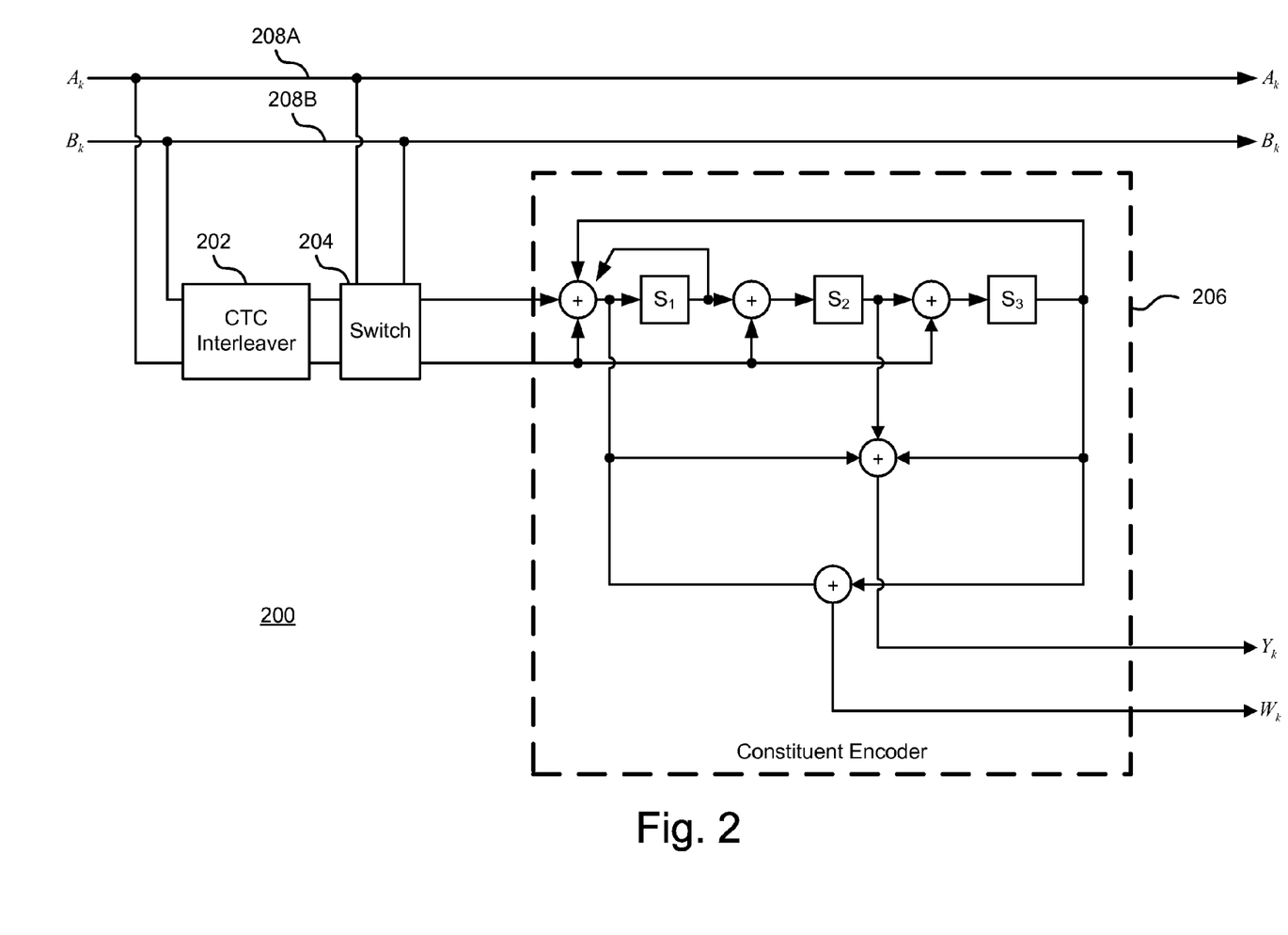
FIG. 2 is a block diagram of a double-binary circular Convolutional Turbo Code (CTS) encoder.

DBCRSC encoded signals are encoded using a convolutional encoder, such as a double-binary circular Convolutional Turbo Code (CTS) encoder 200 shown in FIG. 2, at a transmitter side. The following notations are used to identify signals in the encoder.

$S_k$: Encoder state at time k
$(A_k, B_k)$ Information (systematic) bit couple at time k
$(Y_k, W_k)$ Parity bit couple at time k As shown in FIG. 2, the encoder 200 includes a CTC interleaver 202, a switch 204 and a constituent encoder 206. The CTC interleaver 202 is connected to signal paths 208A and 208B on which $A_k$ and $B_k$, respectively, are applied to receive $A_k$ and $B_k$ as inputs. The CTC interleaver 202 is also connected to the switch 204 to output interleaved bits to the constituent encoder 206 via the switch. The switch 204 is also connected to the signal paths 208A and 208B to route $A_k$ and $B_k$ to the constituent encoder 206 via the switch 204. The constituent encoder 206 includes a number of shift registers $S_1$, $S_2$ and $S_3$ and adders. Although only three shift registers and five adders are shown in FIG. 2, the constituent encoder 206 can have a different number of shift registers and adders.

In operation, the switch 204 is initially set so that the constituent encoder 206 is connected to the signal paths 208A and 208B to receive a block of information (systematic) bits. Thus, the constituent encoder 206 processes the information bits, which are not interleaved, to produce parity bits. After all the information bits have been processed, the switch 204 is set so that the constituent encoder 206 is now connected to the CTC interleaver 202. Thus, the constituent encoder 206 now processes a block of interleaved information bits to produce additional parity bits. The output of the encoder 206 is an DBCRSC encoded signal, which includes $A_k$, $B_k$, $Y_k$ and $W_k$. A characteristic of a circular encoded signal is that if the encoding starts with an initial state, the final state is guaranteed to be the same at the end of encoding entire information bits. This state can be searched through pre-encoding. However, these initial and final states are not known at the receiver side.

Turning back to FIG. 1, the Turbo decoder 100 includes decoding modules 102A and 102B, summing units 104A and 104B, an interleaver 106, a de-interleaver 108 and an output module 110. Also shown in FIG. 1 is a data memory 112, which may or may not be part of the Turbo decoder 100. The data memory 112 is used to store at least one single payload block 114 of a DBCRSC encoded signal to be decoded by the Turbo decoder 100. A single payload block includes all the systematic and parity bits for a single systematic bit sequence before encoding. For a 48-bit systematic sequence, the size of a single payload block is 144 bits.

In FIG. 1, the Turbo decoder 100 includes two decoding modules 102A and 102B, which operate in a serial manner. Thus, in some embodiments, the two decoding modules 102A and 102B can be implemented as a single decoding module. The decoding module 102A operates to decode original systematic bits and encoded bits of the original systematic bits. The decoding module 102B operates to decode the interleaved systematic bits and encoded bits of interleaved systematic bits. The decoding module 102A operates to perform a decoding operation using soft systematic bits and soft parity bits, as well as updated extrinsic information, if any, to produce forward state metrics (FSMs), backward state metrics (BSMs) and extrinsic information. The extrinsic information from the decoding module 102A is transmitted to the summing unit 104A. The summing unit 104A operates to subtract extrinsic information of the de-interleaver 108 and soft systematic bits from the extrinsic information of the decoding module 102A. The output of the summing unit 104A is transmitted to the interleaver 106. The interleaver 106 operates to interleave the received extrinsic information and the soft systematic bits. The output of the interleaver 106 is transmitted to the decoding module 102B.

The decoding module 102B operates to perform a decoding operation using the interleaved data from the interleaver 106 and soft parity bits to produce FSMs, BSMs and updated extrinsic information. As described in detail below, the decoding modules 102A and 102B execute the decoding operation in several iterations. Until a predefined number of iterations is reached, the decoding module 102B outputs the updated extrinsic information to the summing unit 104B. The summing unit 104B operates to subtract the extrinsic information of the interleaver 106 and interleaved soft systematic bits from the updated extrinsic information of the decoding module 102B. The output of the summing unit 104B is transmitted to the de-interleaver 108, where the extrinsic information is de-interleaved. The de-interleaved extrinsic information is transmitted to the decoding module 102A and the summing unit 104 for the subsequent iteration.

However, if the predefined number of iterations is met, then the latest FSMs and BSMs are transmitted to the output module 110, where the received FSMs and BSMs are used to produce the original systematic bits, i.e., a decoded signal of the DBCRSC encoded signal. As shown in FIG. 1, the output module 110 includes a hard decision unit 116 and a de-interleaver 118. The hard decision unit 116 is configured to compute hard decisions using the received FSMs and BSMs. The computed hard decisions are transmitted to the de-interleaver 118, where the hard decisions are de-interleaved to produce the original systematic bits.

A mathematical description of a general Turbo decoding operation, which is used by the decoding modules 102A and 102B of the Turbo decoder 100, is now described. The following notations are used to identify bits or signals in a Turbo decoding module.

$R_k = (A'_k, B'_k, Y'_k, W'_k)$: Received bits for time k, where $$A'_k = m(A_k) + n_k^A,$$

$$B'_k = m(B_k) + n_k^B,$$

$$Y'_k = m(Y_k) + n_k^Y, \text{ and}$$

$$W'_k = m(W_k) + n_k^W, \text{ where}$$

m(•) represents a modulation function, and $n_k^A, n_k^B, n_k^Y, n_k^W$ represent independent Gaussian noise.
$R_1^N = (R_1, \ldots, R_k, \ldots, R_N)$: Received bit sequence for N couples Turbo decoding operation chooses a hypothesis for $A_k$ that maximizes a posterior probability, $Pr(A_k | R_1^N)$. For double-binary encoding scheme, a likelihood ratio associated with $A_k$ can be defined as:

$$\Lambda_k^A = \frac{Pr(A_k B_k = 00 | R_1^N) + Pr(A_k B_k = 01 | R_1^N)}{Pr(A_k B_k = 10 | R_1^N) + Pr(A_k B_k = 11 | R_1^N)}, \quad \text{Eq. 1}$$

and the corresponding decision rule is $$\hat{A}_k = \begin{cases} 0, & \Lambda_k^A \geq 1 \\ 1, & \Lambda_k^A < 1 \end{cases}$$

By defining a metric, $$\Lambda_k^{ab} = \frac{Pr(A_k B_k = 00 | R_1^N)}{Pr(A_k B_k = ab | R_1^N)} = \frac{\sum_m \lambda_k^{00,m}}{\sum_m \lambda_k^{ab,m}} \quad \text{Eq. 2}$$

where $$\lambda_k^{ab,m} = Pr(A_k B_k = ab, S_k = m | R_1^N), \quad \text{Eq. 3}$$

Equation 1 can be rewritten as $$\Lambda_k^A = \frac{1 + (1/\Lambda_k^{01})}{(1/\Lambda_k^{10}) + (1/\Lambda_k^{11})}. \quad \text{Eq. 4}$$

It is well known theory that Equation 2 and Equation 3 can be decomposed as follows:

$$\Lambda_k^{ab} = (\text{Priori information}) \cdot (\text{Channel information}) \cdot (\text{Extrinsic information}) \quad \text{Eq. 5}$$

$$\lambda_k^{ab,m} = (\text{Forward state metric}) \cdot (\text{Branch metric}) \cdot (\text{Backward state metric}) \quad \text{Eq. 6}$$

Now, the general procedure of Turbo decoding can be described as follows:
1. The FSM is calculated going forward in time starting at k=1 and are stored in memory. Branch metric (BM) is used to calculate FSM at each k.
2. The BSM is calculated going backwards in time from k=N to 1. BM is also used to calculate BSM at each k.
3. The metric $\lambda_k^{ab,m}$ is calculated according to Equation 6.
4. The metric $\Lambda_k^{ab}$ is calculated according to Equation 2.
5. Extrinsic information is calculated according to Equation 4 and exchanged between two component decoders after interleaving or de-interleaving.
6. Iterate until a stopping criterion is satisfied.

The decoding modules 102A and 102B of the Turbo encoder 100 generally follow these steps to perform Turbo decoding in accordance with embodiments of the invention.

It can be shown that the optimal rule for estimating the initial (and final) state is choosing k that maximizes $$Pr(S_k = m | R_1^N) = \sum_{ab=00}^{11} \lambda_k^{ab,m}. \quad \text{Eq. 7}$$

However, the optimal Turbo decoding process to decode a DBCRSC encoded signal with unknown initial and final states involves excessively long decoding delay, complex calculation, and significant amount of memory to save all intermediate metrics. The Turbo decoder 100 in accordance with embodiments of the invention uses a technique to lessen decoding delay, calculation complexity, and memory requirement.

Figure 3:
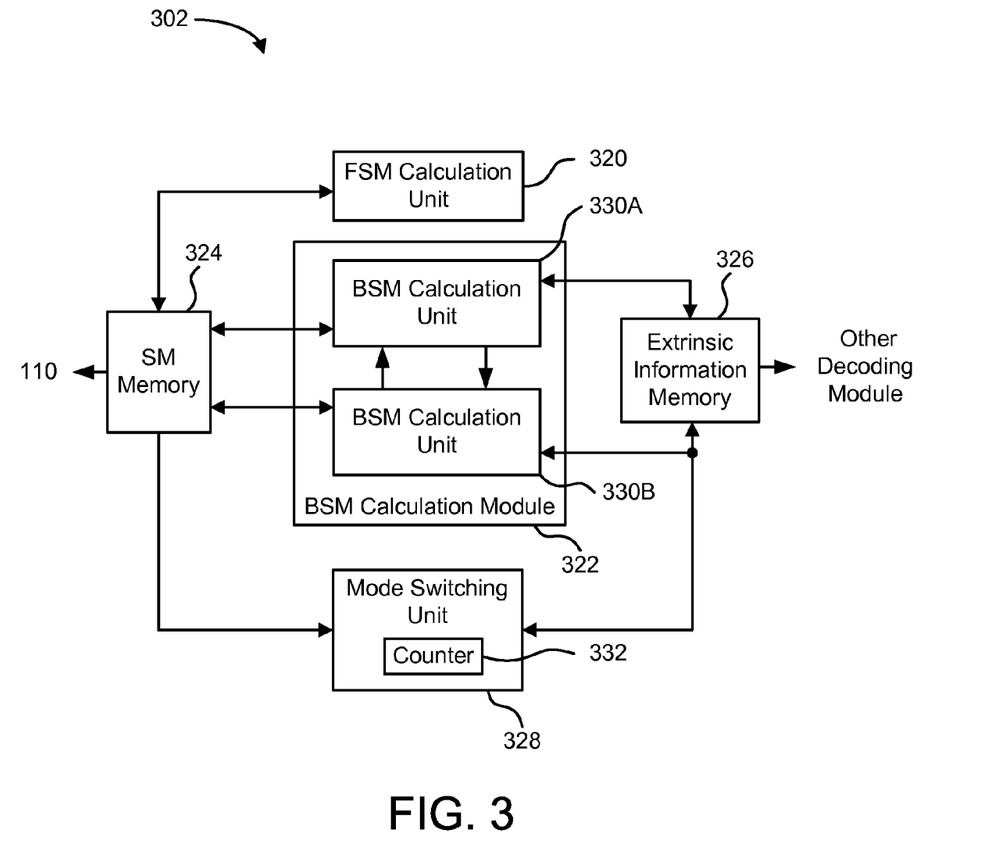
FIG. 3 is a block diagram of a decoding module in accordance with an embodiment of the invention.

Turning now to FIG. 3, a decoding module 302 in accordance with an embodiment of the invention. The decoding module 302 may be used as one or both of the decoding modules 102A and 102B of the Turbo decoder 100. The decoding module is based on a Viterbi sliding window architecture. The decoding module 302 includes a FSM calculation unit 320, a BSM calculation module 322, a state metric (SM) memory 324, an extrinsic information memory 326 and a mode switching unit 328.

The FSM calculation unit 320 is configured to iteratively perform a forward recursion on portions of a target code block of a DBCRSC encoded signal using a sliding window to produce FSMs. The forward recursion is an operation which involves performing complex calculations. One possible implementation of forward recursion is similar to an add-compare-select operation for Viterbi decoding. The forward recursion is a well-known process for Turbo decoding, and thus, is not described herein in detail. The target code block processed by the FSM calculation unit 320 includes a payload block and a padded block. The padded block is at least a portion of the payload block. The length of the payload block is referred to herein as the payload length (PL) and the length of the padded block is referred to herein as the state converge length (SCL). In some situations, the padded block may be longer than the payload block, i.e., SCL>PL. In other situations, the padded block may be shorter than the payload block, i.e., SCL<PL. The size of the portions processed by the FSM calculation unit depends on a sliding window. The length of the sliding window is referred to herein as the sliding window length (SWL).

The FSM calculation unit 320 is configured to perform the forward recursion on at least one selected portion of the target code block for training using an estimated starting FSM to compute an ending FSM at the back-end of the selected portion, which is used as the starting FSM for at least one subsequent portion of the target code block. In an embodiment, the FSM calculation unit 320 is configured to perform the forward recursion for training on the first portion of the target code block to compute the estimated FSM, which is used as the starting state for the second portion of the target code block, which is the next portion of the target code block.

The estimated starting FSM for the first iteration of forward recursion executed by the FSM calculation unit 320 is an arbitrary FSM. For subsequent iterations, the FSM calculation unit 320 is configured to store an estimated FSM at the end of one of the portions of the target code block, which may be used for the next iteration of the forward recursion on one of the portions of the target code block, e.g., the first portion of the target code block. As described below, the iterations of forward recursion on the portions of the target code block continue until a stop criterion is satisfied, which may be a predefined number of iterations. In an embodiment, the FSM calculation unit 320 is configured to execute a conventional forward recursion of a conventional Turbo decoding process for decoding an encoded signal when initial and final states of the encoded signal are known when a predefined condition is satisfied, as described below. Thus, the mode of operation for the FSM calculation unit 320 can be switched between different forward recursions, where one of the forward recursions is a conventional forward recursion, which does not require initial FSM estimation.

The SM memory 324 is connected to the FSM calculation unit 320. The SM memory 324 is used to store the FSMs, including the latest estimated FSM, produced by the FSM calculation unit 320. Thus, the FSM calculation unit 320 can access the SM memory 324 to retrieve the stored estimated FSM to execute an iteration of forward recursion on the portions of the target code block. The SM memory 324 is also connected to the BSM calculation module 322, which accesses the SM memory to store and retrieve data, including the FSMs stored in the SM memory to perform a backward recursion, as described below. The SM memory 324 is also connected to the Mode Switching Unit 328, which also accesses the FSMs stored in the SM memory to determine whether to switch the operational mode of the FSM calculation unit 320 and the BSM calculation module 322, as described below. The SM memory 324 is also connected to the hard decision unit 116 of the output module 110 to provide the latest FSMs.

The BSM calculation module 322 is configured to iteratively perform a backward recursion, which includes performing extrinsic information calculations, on the portions of the target code block using the latest FSM produced by the FSM calculation unit 320 and using an estimated BSM to produce BSMs and extrinsic information. Thus, the BSM calculation module 322 accesses the SM memory 324 to retrieve the latest FSMs stored in the SM memory to perform the backward recursion and the extrinsic information calculation. A backward recursion performed by the BSM calculation module 322 is also well-known process for Turbo decoding, and thus, is not described herein in detail. The BSM calculation module 322 is configured to perform the backward recursion on at least one selected portion of the target code block for training using an estimated starting BSM to compute an ending BSM at the front-end of the selected portion, which is used as the starting BSM for at least one other portion of the target code block. In an embodiment, the BSM calculation module 322 is configured to perform the backward recursion for training on the each of portions of the payload block to compute respective ending BSMs, which are used as the starting BSMs for the portions of the target code block, including the portion or portions of the padded block.

In an embodiment, as illustrated in FIG. 3, the BSM calculation module 322 includes two BSM calculation units 330A and 330B, each of which is configured to perform the backward recursion on selected portions of the target code block. Thus, the backward recursion can be performed in parallel for some of the portions of the target code block to reduce the processing time to produce the BSMs for the target code block.

The estimated starting BSM for the first iteration of backward recursion executed by the BSM calculation module 322 is an arbitrary BSM. For subsequent iterations, the BSM calculation module 322 is configured to store an estimated BSM at the end of one of the portions of the target code block, which may be used for the next iteration of the backward recursion on one of the portion of the target code block, e.g., the second block of the target code block. Similar to the iterations of forward recursion, the iterations of backward recursion on the portions of the target code block continue until the stop criterion is satisfied. In an embodiment, the BSM calculation module 322 is configured to execute a conventional backward recursion of a conventional Turbo decoding process for decoding an encoded signal when initial and final states of the encoded signal are known when a predefined condition is satisfied, as described below. Thus, the mode of operation for the BSM calculation module 322 can be switched between different backward recursions, where one of the backward recursions is a conventional backward recursion, which does not require initial BSM estimation.

The extrinsic information memory 326 is connected to the BSM calculation module 322. The extrinsic information memory 326 is used to store the extrinsic information produced by the BSM calculation module 322. The extrinsic information memory 326 is also connected to the other decoding module of the Turbo decoder 100, e.g., the decoding module 102B.

The mode switching unit 328 is configured to calculate the most probable circular state m of the payload block, i.e., the initial/final state, using equation 6 and using the latest BSMs and FSMs stored in the SM memory 324 and the extrinsic information stored in the extrinsic information memory 326 for each iteration of forward and backward recursions. The mode switching unit 328 is configured to compare the current most probable circular state m with the last most probable circular state m to determine if the two most probable circular state m are the same. The number of times when two consecutive most probable circular state m are the same are recorded using a counter 332, which counts these occurrences. When the count in the counter 332 reaches a predefined number, the mode switching unit 328 instructs the FSM calculation unit 320 and the BSM calculation module 322 to switch to perform a conventional recursion operation on the payload block using the latest most probable circular state m as the starting and ending states for the payload block.

The decoding operation of the decoding module 302 in accordance with a first embodiment of the invention is now described. The decoding operation of the decoding module 302 will vary depending on the relative lengths of the payload block and the padded block of a total code block being processed. The decoding operation of the decoding module 302 when the length of the payload block (PL) is longer than the length of the padded block (SCL) will be described first with reference to FIG. 4, which shows a total code block 400 that includes a payload block 402 of a DBCRSC encoded signal and a padded block 404. In this embodiment, the padded block 404 is located after the payload block 402, i.e., in back of the payload block. The initial and final states of the payload block 402 are the same but unknown to the decoding module 302. In this example, the PL is 96 couples, the SCL is 24 couples and the SWL is 24 couples. Thus, the total code block 400 includes five portions of 24 couples, which are indicated in sequence as W1, W2, W3, W4 and P1 from the front of the total code block 400 to the back of the total code block. Thus, the two ends of a portion of the total code block 400 will be referred to herein as the front-end and the back-end according to the front and back of the total code block. The first four portions W1, W2, W3 and W4 are part of the payload block 402 and the fifth portion P1 is the padded block 404. Thus, the portions W1, W2, W3 and W4 belong to the payload block 402 and the portion P1 belongs to the padded block 404. The portions W2 and W3, which are situated between the end portions W1 and W4, are referred to herein as interior portions. In this embodiment, the portion P1 of the padded block 404 is identical to the portion W1 of the payload block 402. However, in other embodiments, the length of the padded block 404 may be longer or shorter.

Figure 4:
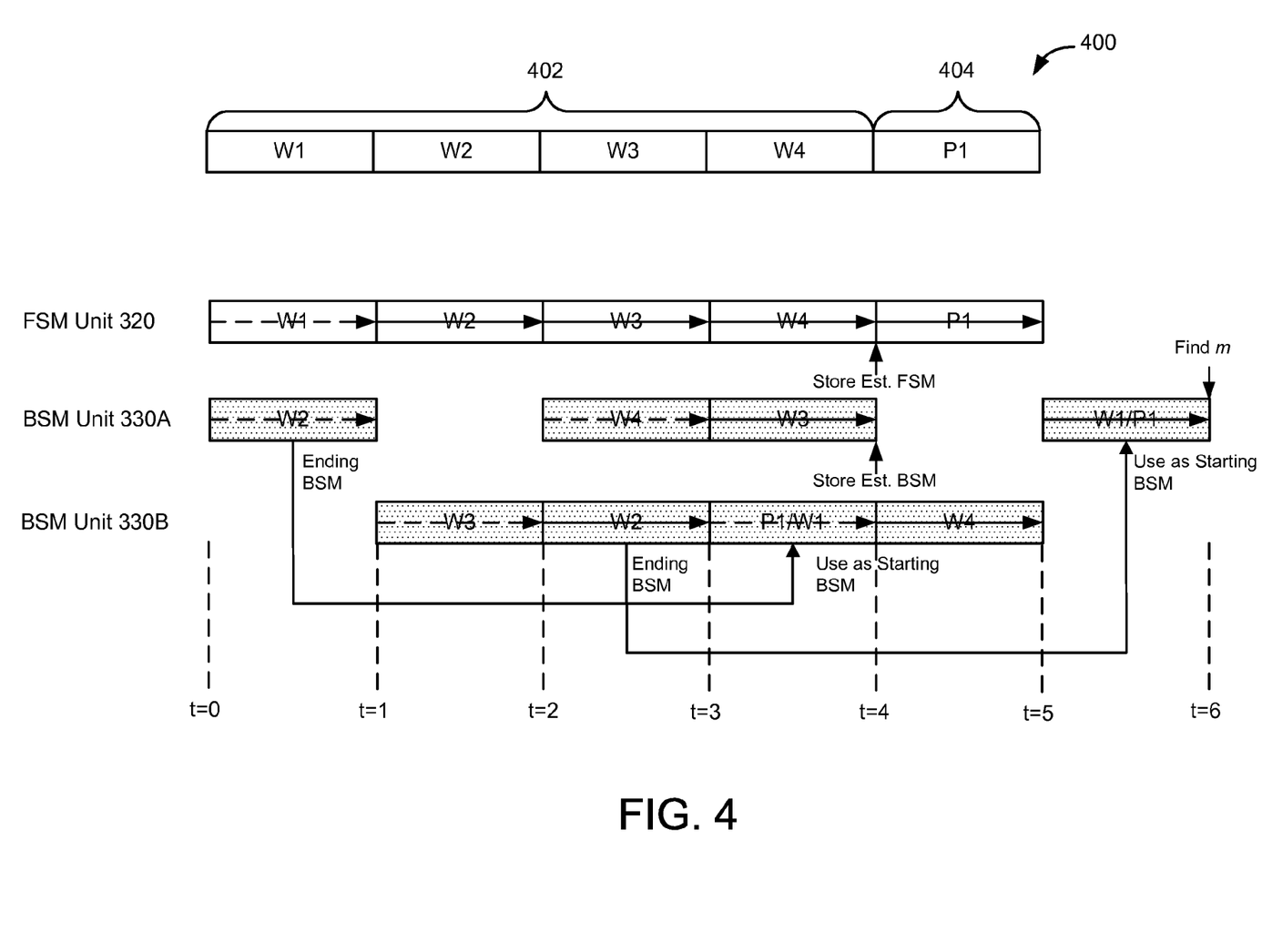
FIG. 4 illustrates a decoding operation of the decoding module of FIG. 3 when the length of a payload block being decoded is longer than the length of a padded block in accordance with a first embodiment of the invention.

Initially, the payload block 402 to be decoded is stored in the data memory 112. The FSM calculation unit 320 and the BSM calculation module 322 have access to the stored payload block 402 in the data memory 112. Thus, the FSM calculation unit 320 and the BSM calculation module 322 can receive the total code block 400, which includes the payload block 402 and the padded block 404. Each of the metric calculation units 320, 330A, and 330B can access desired portion of payload block 402 at the same time, as long as the memory segments are non-overlapping, resulting in reduced processing delay.

As illustrated in FIG. 4, the FSM calculation unit 322 performs the forward recursion on the portions W1, W2, W3, W4 and P1 of the total code block 400, starting with the portions W1, W2, W3 and W4 of the payload block 402 and then the portion P1 of the padded block 404. At t=0, the FSM calculation unit performs the forward recursion on the portion W1 of the total code block 400 using an estimated FSM. Since the initial and final states of the payload block 402 are unknown, an arbitrary starting FSM, e.g., all zeros for all states, is initially used as the estimated FSM for the forward recursion on the portion W1 of the total code block 400. The forward recursion on the portion W1 is for training, as indicated by the dotted arrow, and thus, computed FSMs for this forward recursion are not used, except for the computed FSM at the back-end of the portion W1. The computed FSM at the back-end of the portion W1 is then used as the starting FSM for the forward recursion on the next portion W2 at t=1. Similarly, the computed FSM at the back-end of the portion W2 is used as the starting FSM for the forward recursion on the next portion W3 at t=2, and so on. Thus, the computed FSM at the back-end of the portion W4 is used as the starting FSM for the forward recursion on the padded portion P1 at t=5. In an embodiment, the computed FSM at the back-end of the portion W4 is saved and stored as an estimated FSM, which may be used for the next iteration of forward recursion on the total code block 400, i.e., for the first forward recursion on the portion W1.

The BSM calculation unit 330A performs the backward recursion on the portions W2, W4, W3 and W1/P1 (W1/P1 means either W1 or P1). The BSM calculation unit 330B performs the backward recursion on the portions W3, W2, W1/P1 and W4.

At t=0, the BSM calculation unit 330A performs the backward recursion on the portion W2 of the total code block 400 using an estimated BSM. Initially, an arbitrary starting BSM, e.g., all zeros for all states, is used as the estimated BSM for the backward recursion on the portion W2. The backward recursion on the portion W2 is for training, as indicated by the dotted arrow, and thus, computed BSMs for this backward recursion are not used, except for the computed BSM at the front-end of the portion W2. The computed BSM at the front-end of the portion W2 is used as the starting BSM for the portion P1/W1 at t=3 by the BSM calculation unit 330B.

At t=1, the BSM calculation unit 330B performs the backward recursion on the portion W3 using an arbitrary starting BSM. The backward recursion on the portion W3 is also for training, and thus, computed BSMs for this backward recursion are also not used, except for the computed BSM at the front-end of the portion W3. The computed BSM at the front-end of the portion W3 is used as the starting BSM for the portion W2 at t=2 by the BSM calculation unit 330B.

At t=2, the BSM calculation unit 330B performs the backward recursion, including the extrinsic information calculation, on the portion W2 using the computed BSM at the front-end of the portion W3, which was computed by the BSM calculation unit 330B, and using the computed FSMs for the portion W2. The computed BSM at the end of this recursion is used as starting BSM for the portion W1/P1 by the BSM calculation unit 330A later. Also at t=2, the BSM calculation unit 330A performs the backward recursion on the portion W4 using an arbitrary starting BSM. The backward recursion on the portion W4 is also for training, and thus, computed BSMs for this backward recursion are also not used, except for the computed BSM at the front-end of the portion W4. The computed BSM at the front-end of the portion W4 is used as the starting BSM for the portion W3 at t=3 by the BSM calculation unit 330A.

At t=3, the BSM calculation unit 330A performs the backward recursion, including the extrinsic information calculation, on the portion W3 using the computed BSM at the front-end of the portion W4, which was computed by the BSM calculation unit 330A, and using the computed FSMs for the portion W3. Also at t=3, the BSM calculation unit 330B performs the backward recursion on the portion P1/W1 using the computed BSM at the front-end of the portion W2, which was computed by the BSM calculation unit 330A during the time period between t=0 and t=1. In an embodiment, the computed BSM at the front-end of the portion W3 is saved and stored as an estimated BSM, which may be used for the next iteration of backward recursion on the total code block 400, i.e., for the first backward recursion on the portion W2.

At t=4, the BSM calculation unit 330B performs the backward recursion, including the extrinsic information calculation, on the portion W4 using the BSM at the front-end of the portion P1/W1, which was computed by the BSM calculation unit 330B, and using the computed FSMs for the portion W4.

At t=5, the BSM calculation unit 330A performs the backward recursion, including the extrinsic information calculation, on the portion W1/P1 using the BSM at the front-end of the portion W2, which was computed by the BSM calculation unit 330B during the time period between t=2 and t=3, and using the computed FSMs for the portion P1.

As illustrated in FIG. 4, each of the FSM unit 320 and the BSM units 330A and 330B always operates on a mutually exclusive portion of the payload block 402, and thus, memory access conflicts are avoided.

Next, the mode switching unit 328 computes the most probable circular state m using equation 6 and using the latest FSMs and BSMs for the total code block 400. The latest most probable circular state m for the current iteration of forward and backward recursions is then compared to the most probable circular state m for the last iteration. If the two consecutive most probable circular states are the same, then the count in the counter 332 is incremented. When the count reaches a predefined threshold, such as count=3, then the operational mode of the FSM calculation unit 320 and the BSM calculation module 322 is switched to a conventional Turbo decoding operation using the latest most probable circular state m as a hard circular state for the remaining iterations. However, if the count has not reached the predefined threshold, then the next iteration is performed using the stored estimated FSM for the forward recursion on the portion W1 and using the stored estimated BSM for the backward recursion on the portion W2, which are the first portions of the total code block 400 that are processed.

In an alternative embodiment, the estimated FSM and BSM for the next iteration use a common metric that is derived from the current most probable circular state m as normalized $\lambda_k^{ab,m}$ using equation 6, which may be computed by the mode switching unit 328. In this alternative embodiment, the estimated FSM and BSM would not be stored during the forward and backward recursions.

The decoding operation of the decoding module 302 in accordance with the first embodiment when the length of the payload block (PL) is shorter than the length of the padded block (SCL) will be described with reference to FIG. 5, which shows a total code block 500 that includes a payload block 502 of a DBCRSC encoded signal and a padded block 504. The initial and final states of the payload block 502 are the same but unknown to the decoding module. In this example, the PL is 24 couples, the SCL is 96 couples and the SWL is 24 couples. Thus, the total code block 500 includes five portions of 24 couples, which are indicated in sequence as W1, P1, P2, P3 and P4. The first portion W1 is the entire payload block 502 and the following four portions P1, P2, P3 and P4 are part of the padded block 504. In this embodiment, each of the portions P1, P2, P3 and P4 of the padded block 504 are identical to the portion W1 of the payload block 502.

Initially, the payload block 502 to be decoded is stored in the data memory 112. The FSM calculation unit 320 and the BSM calculation module 322 have access to the stored payload block 502 in the data memory 112. Thus, the FSM calculation unit 320 and the BSM calculation module 322 can receive the total code block 500, which includes the payload block 502 and the padded block 504.

Figure 5:
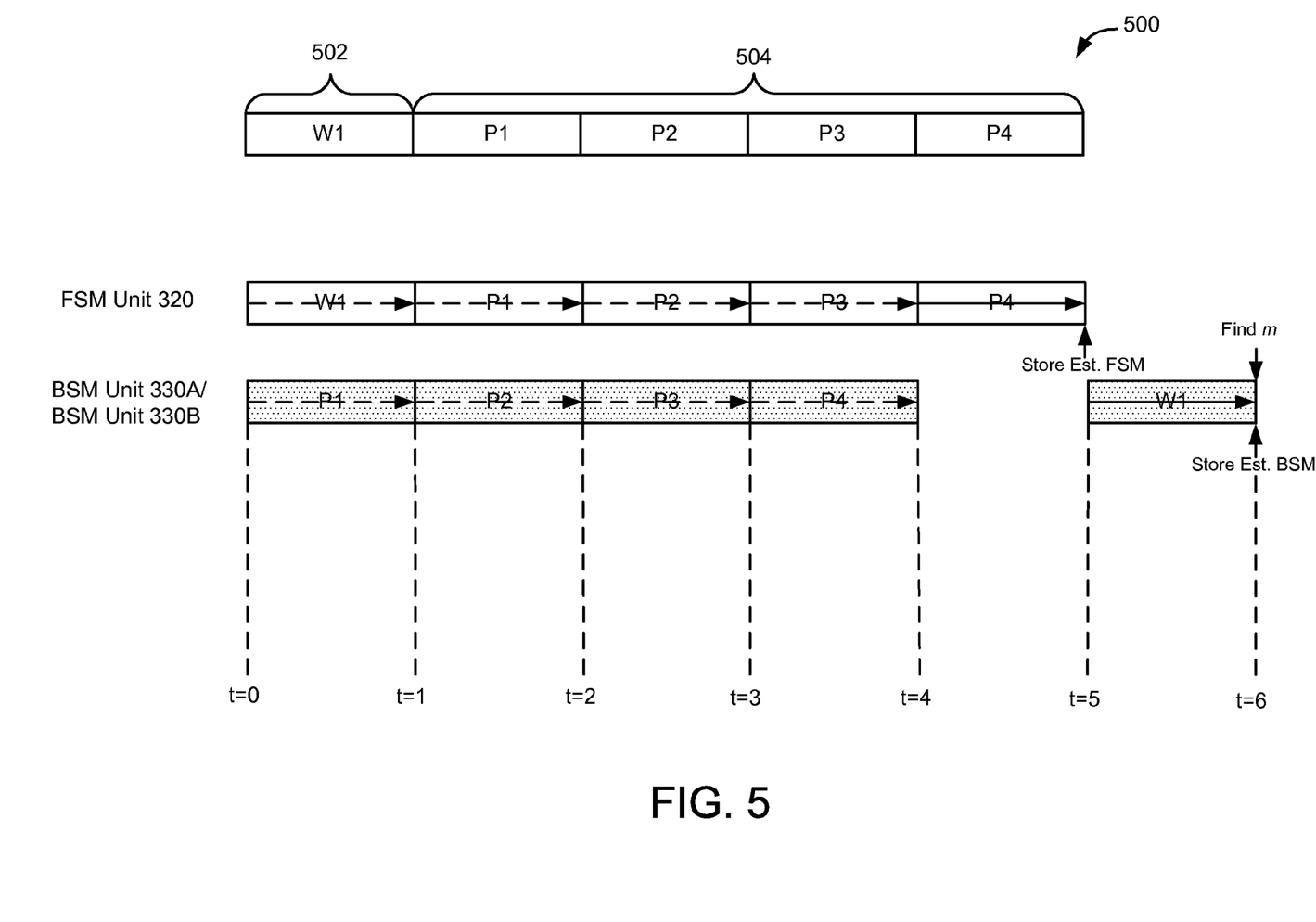
FIG. 5 illustrates a decoding operation of the decoding module of FIG. 3 when the length of a payload block being decoded is shorter than the length of a padded block in accordance with the first embodiment of the invention.

As illustrated in FIG. 5, the FSM calculation unit 320 performs a forward recursion on the portions W1, P1, P2, P3 and P4 of the total code block 500, starting with the portion W1 of the payload block 502 and then the portions P1, P2, P3 and P4 of the padded block 504. At t=0, the FSM calculation unit 320 performs the forward recursion on the portion W1 of the total code block 500 using an estimated FSM. Since the circular state of the payload block 502 are unknown, an arbitrary starting FSM is initially used as the estimated FSM for the forward recursion on the portion W1 of the total code block 500. The forward recursion on the portion W1 is for training, as indicated by the dotted arrow, and thus, computed FSMs for this forward recursion are not used, except for the computed FSM at the back-end of the portion W1. The computed FSM at the back-end of the portion W1 is then used as the starting FSM for the forward recursion on the next portion P1 at t=1. Similarly, the computed FSM at the back-end of the portion P1 is used as the starting FSM for the forward recursion on the next portion P2 at t=2, and so on. The forward recursion on the portions P1, P2 and P3 are also performed for training. However, the forward recursion on the portion P4 is the actual forward recursion, and thus, the computed FSMs for this forward recursion are saved. The computed FSM at the back-end of the portion P4 is saved and stored as an estimated FSM, which may be used for the next iteration of forward recursion on the total code block 500, i.e., for the first forward recursion on the portion W1.

In this situation, there is no need to perform the backward recursion on two portions of the total code block 500 in parallel. Thus, the BSM calculation unit 330A or the BSM calculation unit 330B may perform the backward recursion on the portions W1, P1, P2, P3 and P4. As illustrated in FIG. 5, the portions W1, P1, P2, P3 and P4 are processed in the following order: P1, P2, P3, P4 and W1. However, since the portions W1, P1, P2, P3 and P4 are identical, the processing order of these portions is irrelevant. For the very first portion being processed, an arbitrary starting BSM is used as the estimated BSM for the backward recursion on that portion for training. The computed BSM at the front-end of each portion is then used as the starting BSM for the next portion being processed. The backward recursion on most of the portions of the total code block 500 is for training, except for the last portion, during which the extrinsic information calculation is also performed. The BSMs and the extrinsic information produced during the last backward recursion are saved. The subsequent decoding process is similar to the previous situation, which was described with reference to FIG. 4, and thus, is not described again.

The decoding operation of the decoding module 302 in accordance with a second embodiment of the invention is now described. Again, the decoding operation of the decoding module 302 will vary depending on the relative lengths of the code block and the padded block of a total code block being processed. The decoding operation of the decoding module 302 when the length of the payload block (PL) is longer than the length of the padded block (SCL) will be described first with reference to FIG. 6, which shows a total code block 600 that includes a payload block 602 of a DBCRSC encoded signal and a padded block 604. In this embodiment, the padded block 604 is located before the payload block 602, i.e., in front of the payload block. The circular state of the payload block 602 is unknown to the decoding module 302. In this example, the PL is 96 couples, the SCL is 24 couples and the SWL is 24 couples. Thus, the total code block 600 includes five portions of 24 couples, which are indicated in sequence as P1, W1, W2, W3 and W4. The first portion P1 is the padded block 604 and the following four portions W1, W2, W3 and W4 are part of the payload block 602. In this embodiment, the portion P1 of the padded block 604 is identical to the portion W4 of the payload block 602.

Figure 6:
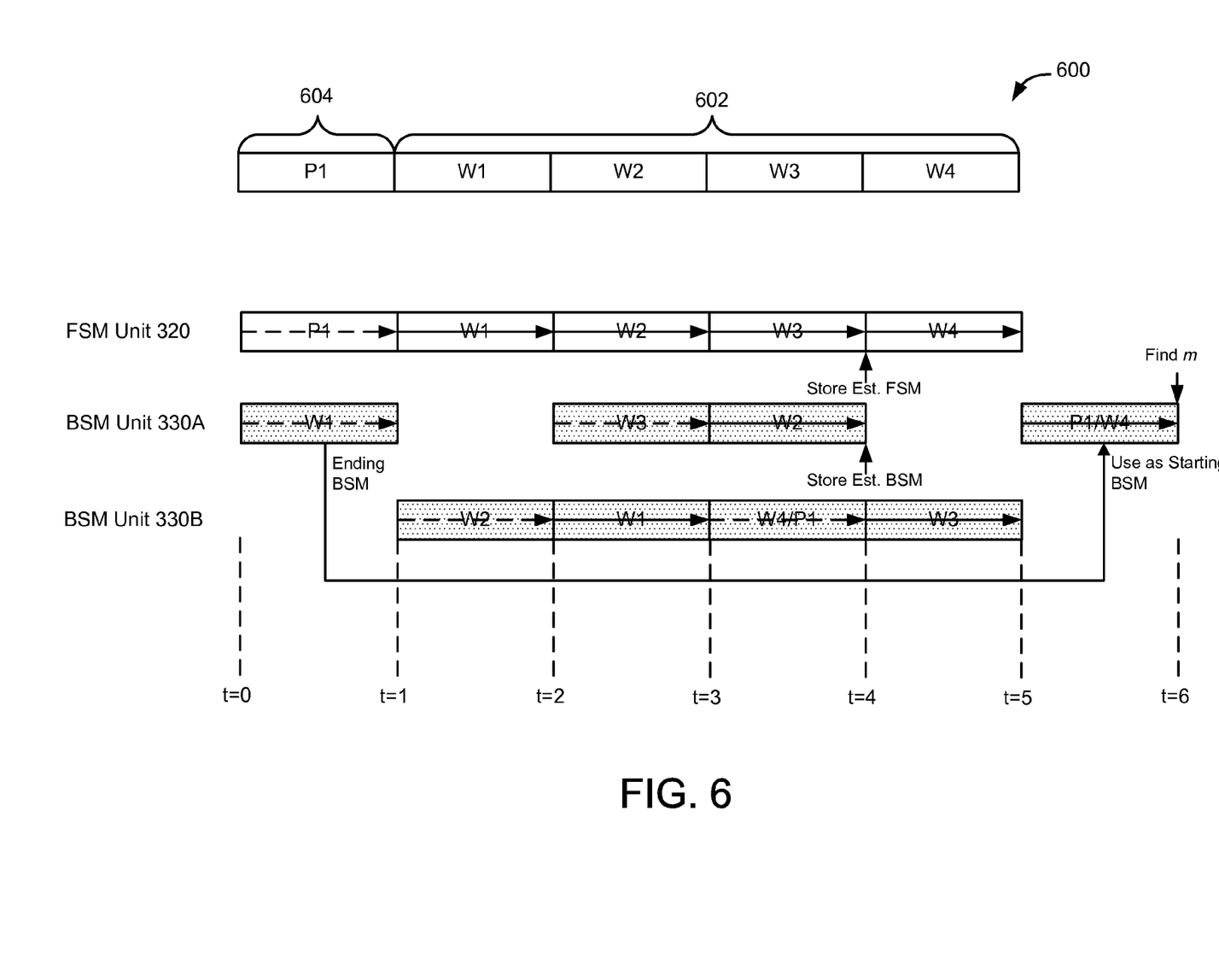
FIG. 6 illustrates a decoding operation of the decoding module of FIG. 3 when the length of a payload block being decoded is longer than the length of a padded block in accordance with a second embodiment of the invention.

Initially, the payload block 602 to be decoded is stored in the data memory 112. The FSM calculation unit 320 and the BSM calculation module 322 have access to the stored payload block 602 in the data memory 112. Thus, the FSM calculation unit 320 and the BSM calculation module 322 can receive the total code block 600, which includes the payload block 602 and the padded block 604. Each of the metric calculation units 320, 330A, and 330B can access desired portion of payload block 602 at the same time, as long as the memory segments are non-overlapping, resulting in reduced processing delay.

As illustrated in FIG. 6, the FSM calculation unit 320 performs a forward recursion on the portions P1, W1, W2, W3 and W4 of the total code block 600, starting with the portion P1 of the padded block 604 and then the portions W1, W2, W3 and W4 of the payload block 602. Although the sequence of the total code block 600 differs from the total code block 400 of the previous embodiment, the forward recursion on the total code block 600 is performed in a similar manner. Thus, in this embodiment, an estimated FSM is used for the forward recursion on the portion P1 of the total code block 600. In an embodiment, the computed FSM at the back-end of the portion W3 of the total code block 600 is saved and stored as an estimated FSM, which may be used for the next iteration of forward recursion on the total code block 600, i.e., for the first forward recursion on the portion P1.

The BSM calculation unit 330A performs the backward recursion on the portions W1, W3, W2 and P1/W4 (P1/W4 means that this portion may be P1 or W4). The BSM calculation unit 330B performs the backward recursion on the portions W2, W1, W4/P1 and W3.

At t=0, the BSM calculation unit 330A performs the backward recursion on the portion W1 of the total code block 600 using an estimated BSM. Initially, an arbitrary starting BSM, e.g., all zeros for all states, is used as the estimated BSM for the backward recursion on the portion W1. The backward recursion on the portion W1 is for training, as indicated by the dotted arrow, and thus, computed BSMs for this backward recursion are not used, except for the computed BSM at the front-end of the portion W1. The computed BSM at the front-end of the portion W1 is used as the starting BSM for the portion P1/W4 at t=5 by the BSM calculation unit 330A.

At t=1, the BSM calculation unit 330B performs the backward recursion on the portion W2 using an arbitrary starting BSM. The backward recursion on the portion W2 is also for training, and thus, computed BSMs for this backward recursion are also not used, except for the computed BSM at the front-end of the portion W2. The computed BSM at the front of the portion W2 is used as the starting BSM for the portion W1 at t=2 by the BSM calculation unit 330B.

At t=2, the BSM calculation unit 330B performs the backward recursion, including the extrinsic information calculation, on the portion W1 using the computed BSM at the front-end of the portion W2, which was computed by the BSM calculation unit 330B, and using the computed FSMs for the portion W1. Also at t=2, the BSM calculation unit 330A performs the backward recursion on the portion W3 using an arbitrary starting BSM. The backward recursion on the portion W3 is also for training, and thus, computed BSMs for this backward recursion are also not used, except for the computed BSM at the front-end of the portion W3. The computed BSM at the front-end of the portion W3 is used as the starting BSM for the portion W2 at t=3 by the BSM calculation unit 330A.

At t=3, the BSM calculation unit 330A performs the backward recursion, including the extrinsic information calculation, on the portion W2 using the computed BSM at the front-end of the portion W3, which was computed by the BSM calculation unit 330A, and using the computed FSMs for the portion W2 In an embodiment, the computed BSM at the front-end of the portion W2 is saved and stored as an estimated BSM, which may be used for the next iteration of backward recursion on the total code block 600, i.e., for the first backward recursion on the portion W1. Also at t=3, the BSM calculation unit 330B performs the backward recursion on the portion W4/P1 using an arbitrary starting BSM. The backward recursion on the portion W4/P1 is also for training, and thus, computed BSMs for this backward recursion are also not used, except for the computed BSM at the front-end of the portion W4/P1. The computed BSM at the front-end of the portion W4/P1 is used as the starting BSM for the portion W3 at t=4 by the BSM calculation unit 330B.

At t=4, the BSM calculation unit 330B performs the backward recursion, including the extrinsic information calculation, on the portion W3 using the BSM at the front-end of the portion P1/W4, which was computed by the BSM calculation unit 330B, and using the computed FSMs for the portion W3.

At t=5, the BSM calculation unit 330A performs the backward recursion, including the extrinsic information calculation, on the portion P1/W4 using the BSM at the front-end of the portion W1, which was computed by the BSM calculation unit 330A during the time period between t=0 and t=1, and using the computed FSMs for the portion W4.

The subsequent decoding process related to computing the most probable circular m using equation 6 for mode switching and for computing estimated FSM and BSM is similar to the previous embodiment, which was described with reference to FIG. 4, and thus, is not described again.

Figure 7:
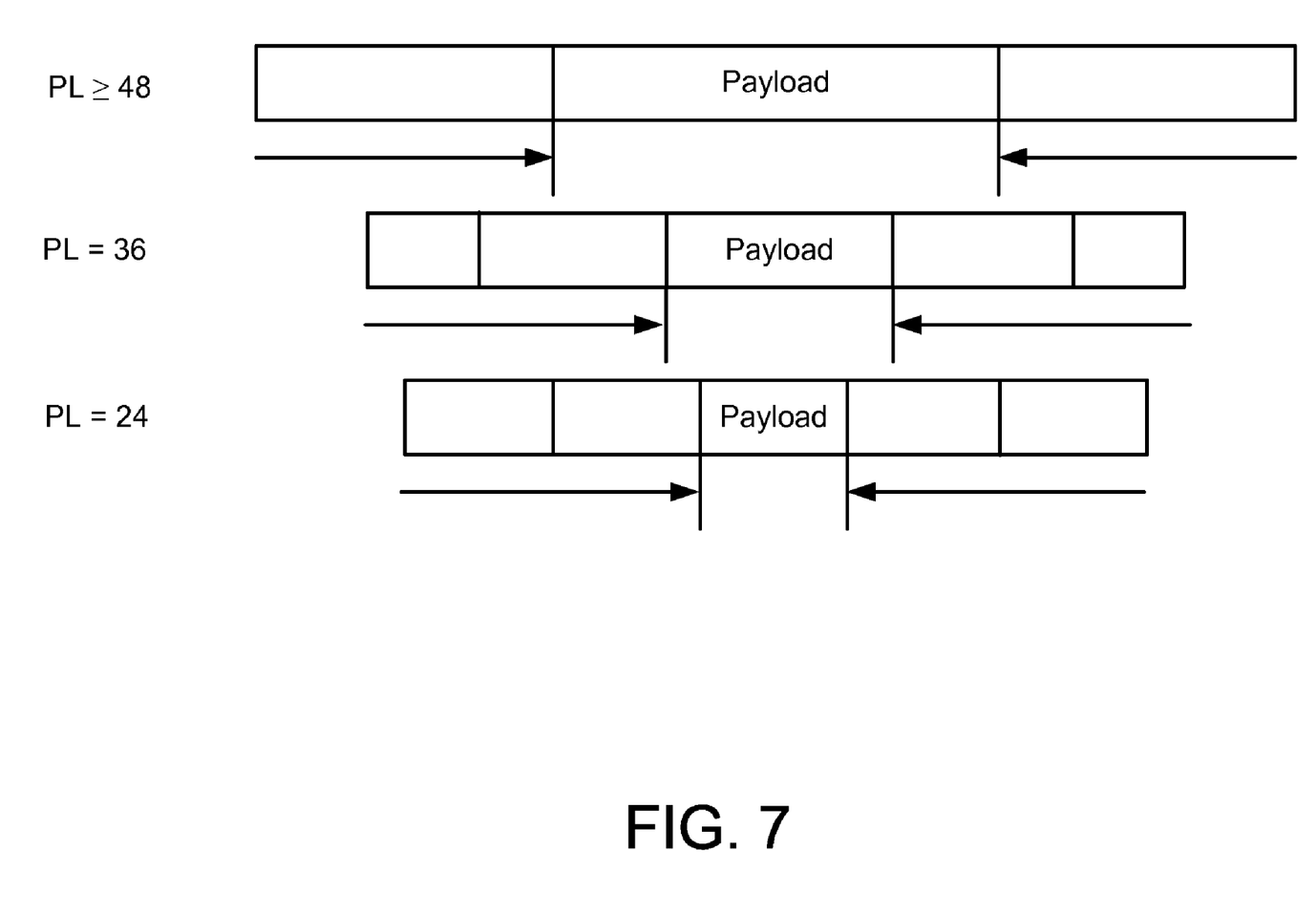
FIG. 7 is a conceptual illustration of the decoding operation in accordance with the second embodiment of the invention.

Conceptually, as illustrated in FIG. 7, the processing of the total code block 600 with respect to forward and backward recursions performed in accordance with the second embodiment can be viewed as the payload block 602 being circularly padded across the payload boundaries. The front padded block is used for training to estimate the starting FSM, while the back padded block is used for training to estimate the starting BSM. In FIG. 7, different payload sizes are illustrated with circularly padded blocks of 48 couples. As illustrated in FIG. 7, the starting FSM is estimated at the end of the forward recursion on the padded block at the front of the payload block and the starting BSM is estimated at the end of the backward recursion on the padded block at the back of the payload block.

The decoding operation of the decoding module in accordance with the second embodiment when the length of the payload block is shorter than the length of the padded block in accordance with this second embodiment will be described first with reference to FIG. 8, which shows a total code block 800 that includes a payload block 802 of a DBCRSC encoded signal and a padded block 804. The circular state of the payload block 802 is unknown to the decoding module. In this example, the PL is 24 couples, SCL is 96 couples and the SWL is 24 couples. Thus, the total code block 800 includes five portions of 24 couples, which are indicated in sequence as P1, P2, P3, P4 and W1. The first four portions P1, P2, P3 and P4 are part of the padded block 804 and the fifth portion W1 is the entire payload block 802. In this embodiment, each of the portions P1, P2, P3 and P4 of the padded block 804 are identical to the portion W1 of the payload block 802.

Initially, the payload block 802 to be decoded is stored in the data memory 112. The FSM calculation unit 320 and the BSM calculation module 322 have access to the stored payload block 802 in the data memory 112. Thus, the FSM calculation unit 320 and the BSM calculation module 322 can receive the total code block 800, which includes the payload block 802 and the padded block 804.

Figure 8:
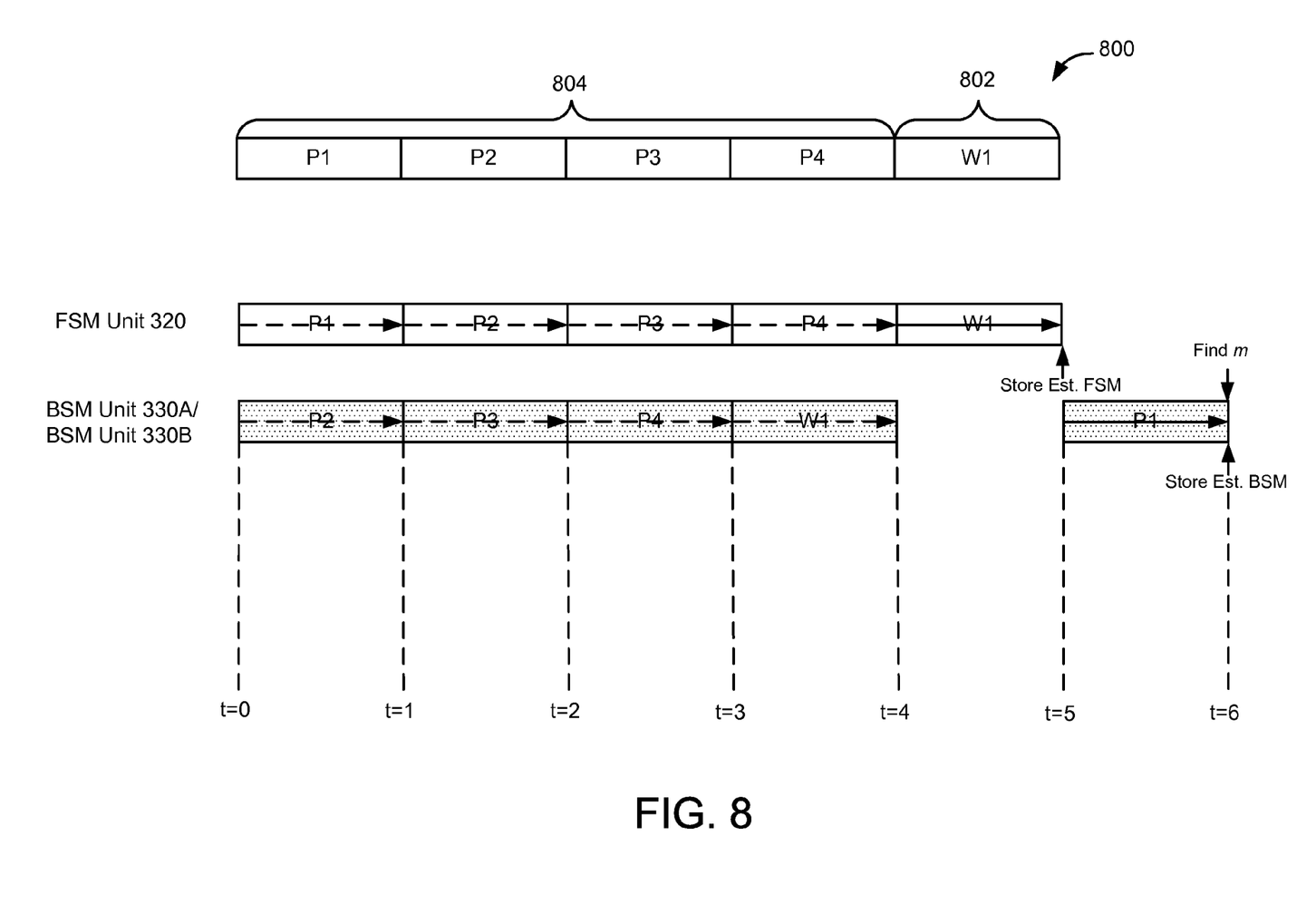
FIG. 8 illustrates a decoding operation of the decoding module of FIG. 3 when the length of a payload block being decoded is shorter than the length of a padded block in accordance with the second embodiment of the invention.

As illustrated in FIG. 8, the FSM calculation unit 320 performs a forward recursion on the portions P1, P2, P3, P4 and W1 of the total code block 800, starting with the portions P1, P2, P3 and P4 of the padded block 804 and then the portion W1 of the payload block 802. At t=0, the FSM calculation unit 320 performs the forward recursion on the portion P1 of the total code block 800 using an estimated FSM. Since the circular state of the payload block 802 is unknown, an arbitrary starting FSM is initially used as the estimated FSM for the forward recursion on the portion P1 of the total code block 800. The forward recursion on the portion P1 is for training, as indicated by the dotted arrow, and thus, computed FSMs for this forward recursion are not used, except for the computed FSM at the end of the portion P1. The computed FSM at the end of the portion P1 is then used as the starting FSM for the forward recursion on the next portion P2 at t=1.

Similarly, the computed FSM at the end of the portion P2 is used as the starting FSM for the forward recursion of the next portion P3 at t=2, and so on. The forward recursion on the portions P2, P3 and P4 are also performed for training. However, the forward recursion on the portion W1 is the actual forward recursion, and thus, the computed FSMs for this forward recursion are saved. The computed FSM at the end of the portion W1 is saved and stored as an estimated FSM, which may be used for the next iteration of forward recursion on the total code block 800, i.e., for the first forward recursion on the portion P1.

Similar to the first embodiment for a situation where the padded block is longer than the payload block, there is no need to perform the backward recursion on two portions of the total code block 800 in parallel. Thus, only one of the BSM calculation units 330A and 330B will perform the backward recursion on the portions P1, P2, P3, P4 and W1. As illustrated in FIG. 8, the portions P1, P2, P3, P4 and W1 are processed in the following order: P2, P3, P4, W1 and P1. However, since the portions P1, P2, P3, P4 and W1 are identical, the processing order of these portions is irrelevant. For the very first portion being processed, an arbitrary starting BSM is initially used as the estimated BSM for the backward recursion on that portion for training. The computed BSM at the front-end of each portion of the total code block 800 is used as the starting BSM for the next portion being processed. The backward recursion for all of the portions of the total code block 800 is for training, except for the last backward recursion, during which the extrinsic information calculation is also performed. The BSMs and the extrinsic information produced during the last backward recursion are saved. The subsequent decoding process related to computing the most probable circular m using equation 6 for mode switching and for computing estimated FSM and BSM is similar to the previous embodiment, which was described with reference to FIG. 4, and thus, is not described again.

Figure 9:
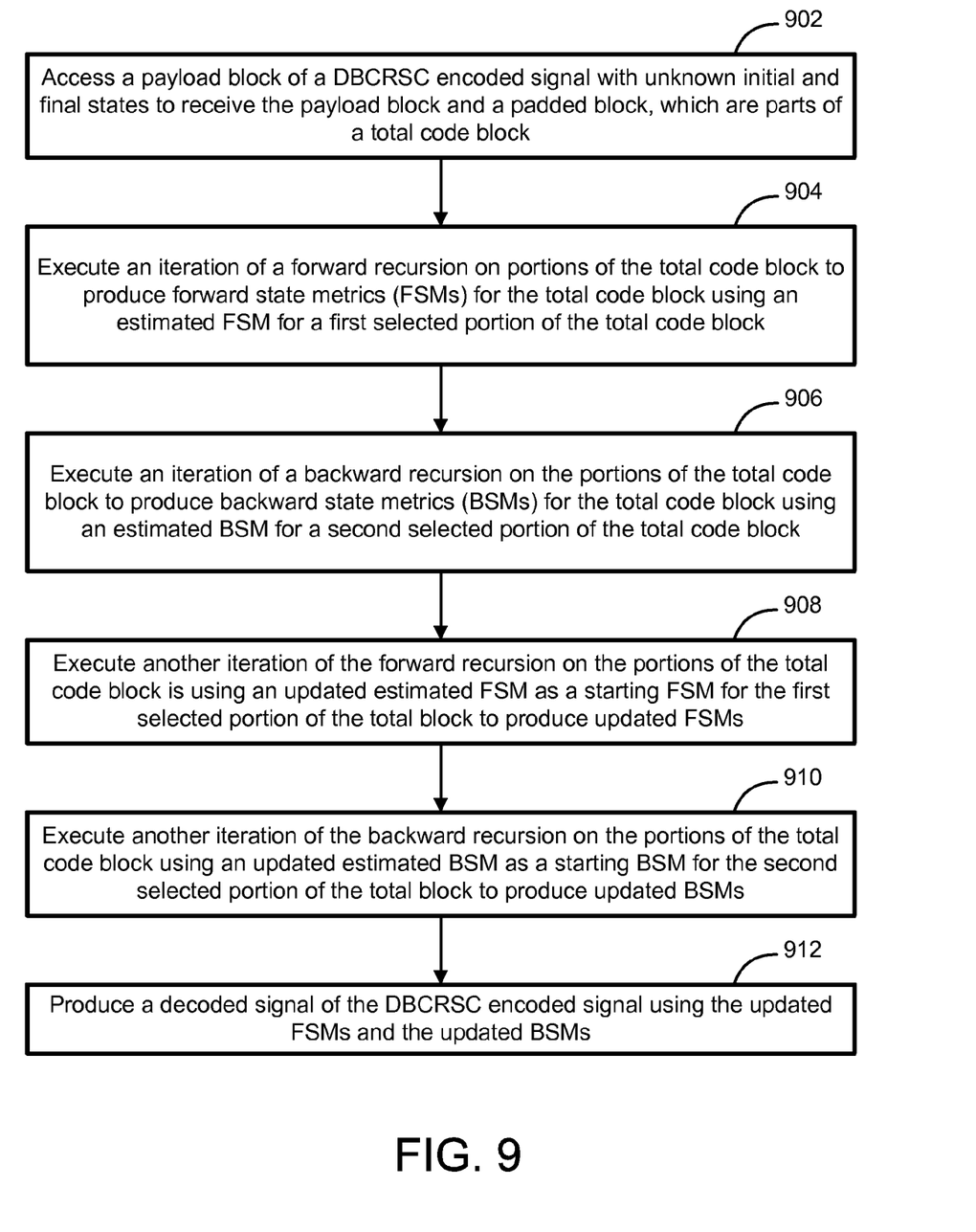
FIG. 9 is a process flow diagram of a method for Turbo decoding a double-binary circular recursive systematic convolutional (DBCRSC) encoded signal in accordance with an embodiment of the invention.

A method for Turbo decoding a double-binary circular recursive systematic convolutional (DBCRSC) encoded signal in accordance with an embodiment of the invention is described with reference to a flow diagram of FIG. 9. At block 902, a payload block of the DBCRSC encoded signal with unknown initial and final states is accessed to receive the payload block and a padded block. The padded block includes at least a portion of the payload block. The payload block and the padded block are parts of a total code block. At block 904, an iteration of a forward recursion on portions of the total code block is executed to produce forward state metrics (FSMs) for the total code block using an estimated FSM for a first selected portion of the total code block, including storing an updated estimated FSM that corresponds to the front-end of the first selected portion. At block 906, an iteration of a backward recursion on the portions of the total code block is executed to produce backward state metrics (BSMs) for the total code block using an estimated BSM for a second selected portion of the total code block, including storing an updated estimated BSM that corresponds to the back-end of the second selected portion. In an embodiment, the blocks 904 and 906 are executed in parallel. At block 908, another iteration of the forward recursion on the portions of the total code block is executed using the updated estimated FSM as a starting FSM for the first selected portion of the total block to produce updated FSMs. At block 910, another iteration of the backward recursion on the portions of the total code block is executed using the updated estimated BSM as a starting BSM for the second selected portion of the total block to produce updated BSMs. In an embodiment, the blocks 908 and 910 are executed in parallel. At block 912, a decoded signal of the DBCRSC encoded signal is produced using the updated FSMs and the updated BSMs Although specific embodiments of the invention have been described and illustrated, the invention is not to be limited to the specific forms or arrangements of parts so described and illustrated. The scope of the invention is to be defined by the claims appended hereto and their equivalents.

What is claimed is:

1. A method for Turbo decoding a double-binary circular recursive systematic convolutional (DBCRSC) encoded signal with unknown initial and final states, said method comprising:

accessing a payload block of the DBCRSC encoded signal with unknown initial and final states to receive the payload block and a padded block, the padded block including at least a portion of the payload block, the payload block and the padded block being parts of a total code block;

executing an iteration of a forward recursion on portions of the total code block to produce forward state metrics (FSMs) for the total code block using an estimated FSM for a first selected portion of the total code block;

executing an iteration of a backward recursion on the portions of the total code block to produce backward state metrics (BSMs) for the total code block using an estimated BSM for a second selected portion of the total code block;

executing another iteration of the forward recursion on the portions of the total code block using an updated estimated FSM as a starting FSM for the first selected portion of the total block to produce updated FSMs;

executing another iteration of the backward recursion on the portions of the total code block using an updated estimated BSM as a starting BSM for the second selected portion of the total block to produce updated BSMs; and producing a decoded signal of the DBCRSC encoded signal using the updated FSMs and the updated BSMs.

2. The method of claim 1 wherein the executing the iteration of the backward recursion on the portions of the total code block to produce the BSMs for the total code block includes performing the backward recursion on some of the portions of the total code block in parallel.

3. The method of claim 1 wherein the executing the iteration of the forward recursion on the portions of the total code block to produce the FSMs for the total code block includes performing the forward recursion first on the first selected portion of the total code block that belongs to the payload block and performing the forward recursion last on another portion of the total code block that belongs to the padded block.

4. The method of claim 3 wherein the executing the iteration of the backward recursion on the portions of the total code block to produce the BSMs for the total code block includes performing the backward recursion first on the second selected portion of the total code block that belongs to the payload block and is an interior portion of the payload block.

5. The method of claim 3 wherein the executing the iteration of the forward recursion on the portions of the total code block to produce the FSMs for the total code block includes storing the updated estimated FSM after all the portions that belong to the payload block have been processed and before any portion of the total block that belongs to the padded block has been processed.

6. The method of claim 3 wherein the executing the iteration of the backward recursion on the portions of the total code block to produce the BSMs for the total code block includes storing the updated estimated BSM after a target portion of the total code block has been processed for a non-training purpose, the target portion being a portion that is the next portion of the second selected portion in the total code block.

7. The method of claim 1 wherein the executing the iteration of the forward recursion on the portions of the total code block to produce the FSMs for the total code block includes performing the forward recursion first on the first selected portion of the total code block that belongs to the padded block and performing the forward recursion last on another portion of the total code block that belongs to the payload block.

8. The method of claim 7 wherein the executing the iteration of the backward recursion on the portions of the total code block to produce the BSMs for the total code block includes performing the backward recursion first on the second selected portion of the total code block that belongs to the payload block and is an end portion of the payload block.

9. The method of claim 7 wherein the executing the iteration of the forward recursion on the portions of the total code block to produce the FSMs for the total code block includes storing the updated estimated FSM after each portion of the padded block has been processed.

10. The method of claim 7 wherein the executing the iteration of the backward recursion on the portions of the total code block to produce the BSMs for the total code block includes storing the updated estimated BSM after a target portion of the total code block has been processed for a non-training purpose, the target portion being a portion that is the next portion of the second selected portion in the total code block.

11. The method of claim 1 further comprising:
estimating a most probable state after each iteration of the forward recursion and the backward recursion until a predefined condition is satisfied; and
switching to a conventional Turbo decoding process for decoding an encoded signal when initial and final states of the encoded signal are known such that a conventional forward recursion and a conventional backward recursion are performed for a subsequent decoding iteration on the total code block.

12. The method of claim 11 wherein the predefined condition is satisfied when a predefined number of consecutive most probable states are the same.

13. The method of claim 11 wherein the storing the updated estimated FSM and BSM n includes calculating the updated estimated FM and BSM by normalizing probable state metrics at the end of the iterations of the forward and backward recursions.

14. A Turbo decoder for decoding a double-binary circular recursive systematic convolutional (DBCRSC) encoded signal with unknown initial and final states, said decoder comprising:
a decoding module connected to receive a payload block of the DBCRSC encoded signal with unknown initial and final states and a padded block, the padded block including at least a portion of the payload block, the payload block and the padded block being parts of a total code block, the total code block having a beginning and an end, the decoding module comprising;
a forward state metric (FSM) calculation unit configured to execute an iteration of a forward recursion on portions of the total code block to produce FSMs for the total code block using an estimated FSM for a first selected portion of the total code block, the FSM calculation unit being further configured to execute another iteration of the forward recursion on the portions of the total code block using an updated estimated FSM as a starting FSM for the first selected portion of the total block to produce updated FSMs; and
a backward state metric (BSM) calculation module configured to execute an iteration of a backward recursion on the portions of the total code block to produce BSMs for the total code block using an estimated BSM for a second selected portion of the total code block, the BSM calculation unit being further configured to perform another iteration of the backward recursion on the portions of the total code block using an updated estimated BSM for a starting BSM for the second selected portion of the total block to produce updated BSM; and
an output module operably connected to the decoding module, the output module being configured to produce a decoded signal of the DBCRSC encoded signal using the updated FSMs and the updated BSMs.

15. The Turbo decoder of claim 14 wherein the BSM calculation module includes multiple BSM calculation units that are configured to performing the backward recursion on some of the portions of the total code block in parallel.

16. The Turbo decoder of claim 14 wherein the FSM calculation unit is configured to perform the forward recursion first on the first selected portion of the total code block that belongs to the payload block and to perform the forward recursion last on another portion of the total code block that belongs to the padded block.

17. The Turbo decoder of claim 16 wherein the BSM calculation module is configured to perform the backward recursion first on the second selected portion of the total code block that belongs to the payload block and is an interior portion of the payload block.

18. The Turbo decoder of claim 16 wherein the FSM calculation unit is configured to store the updated estimated FSM after all the portions that belong to the payload block have been processed and before any portion of the total block that belongs to the padded block has been processed.

19. The Turbo decoder of claim 16 wherein the BSM calculation module is configured to store the updated estimated BSM after a target portion of the total code block has been processed for a non-training purpose, the target portion being a portion that is the next portion of the second selected portion in the total code block.

20. The Turbo decoder of claim 14 wherein the FSM calculation unit is configured to perform the forward recursion first on the first selected portion of the total code block that belongs to the padded block and performing the forward recursion last on another portion of the total code block that belongs to the payload block.

21. The Turbo decoder of claim 20 wherein the BSM calculation module is configured to perform the backward recursion first on the second selected portion of the total code block that belongs to the payload block and is an end portion of the payload block.

22. The Turbo decoder of claim 20 wherein the FSM calculation unit is configured to store the updated estimated FSM after each portion of the padded block has been processed.

23. The Turbo decoder of claim 20 wherein the BSM calculation module is configured to store the updated estimated BSM after a target portion of the total code block has been processed for a non-training purpose, the target portion being a portion that is the next portion of the second selected portion in the total code block.

24. The Turbo decoder of claim 14 further comprising a mode switching unit configured to estimate a most probable state after each iteration of the forward recursion and the backward recursion until a predefined condition is satisfied, the mode switching unit being further configured to control the FSM calculation unit and the BSM calculation module to switch to a conventional Turbo decoding process for decoding an encoded signal when initial and final states of the encoded signal are known such that a conventional forward recursion and a conventional backward recursion are performed for a subsequent decoding iteration on the total code block.

25. The Turbo decoder of claim 24 wherein the predefined condition is satisfied when a predefined number of consecutive most probable states are the same.

26. The Turbo decoder of claim 24 wherein the mode switching unit is configured to calculate the updated estimated FM and BSM by normalizing probable state metrics at the end of the iterations of the forward and backward recursions.

* * * * *